3,799,971
N(p-n-ALKANOYLOXYBENZYLIDENE(-p'-AMINOPHENYL ACETATE

Edward L. Steiger and Heinz J. Dietrich, Toledo, Ohio, assignors to Owens-Illinois, Inc.
No Drawing. Filed Aug. 23, 1971, Ser. No. 174,174
Int. Cl. C07c *119/10*
U.S. Cl. 260—479 R       2 Claims

ABSTRACT OF THE DISCLOSURE

This is disclosed the preparation of novel mesomorphic compounds of the structure:

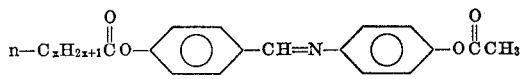

where $x$ is an integer of 1 to 10. The compounds are prepared by the reaction of para-acetoxyaniline and para-n-alkanolyloxybenzaldehyde.

THE DISCLOSURE

This invention relates to the preparation of mesomorphic compounds. More particularly, this invention relates to the preparation of mesomorphic compounds which may be utilized in display type devices.

Mesomorphic materials, typically referred to as liquid-crystal materials, are organic compounds in a transition state between crystalline solid and normal isotropic liquid forms. Such materials are well known in the prior art. Likewise, it is known in the prior art to use such liquid-crystal materials in display type devices.

In accordance with this invention, there is prepared N(p - n-alkanoyloxybenzylidene)-p'-aminophenylacetate liquid-crystal compounds of the structure:

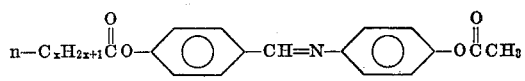

where $x$ is an integer of 1 to 10, preferably 1 to 5, by the reaction of para-acetoxyaniline,

and para-n-alkanoyloxybenzaldehyde,

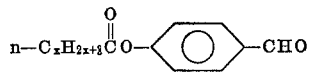

where $x$ is as defined above.

The para-n-alkanoyloxybenzaldehydes of this invention are prepared by reacting para-hydroxybenzaldehyde with an appropriate n-alkanoic acid halide (which are both commercially available) in the presence of an inorganic base such as lithium hydroxide, sodium hydroxide, or potassium hydroxide and water. Organic bases such as pyridine or trialkyl amines under dry conditions may be substituted. These reactions are conducted under sub-ambient temperature, e.g. 0° to 10° C. The para-hydroxybenzaldehyde, inorganic base and water or organic base are placed in a reaction vessel. The n-alkanoic acid halide is then slowly added with external cooling to control a temperature exotherm. After addition, the mixture is allowed, under agitation, to warm to room temperature and remain for 2 to 4 hours. The reaction mixture is then quenched into water and the product is isolated by extraction with a water immiscible organic solvent, first under basic conditions and then followed by acidic conditions. The product is purified by fractional distillation.

The following equation is representative of the reaction of para-acetoxyaniline and para-n-alkanoyloxybenzaldehyde:

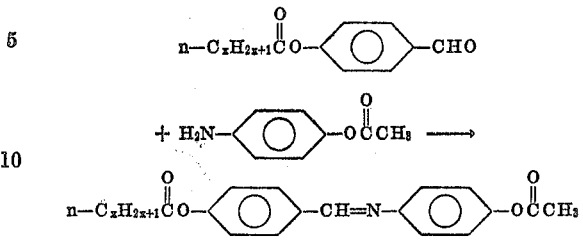

The para-acetoxyaniline, also known as para amino phenyl acetate, is commercially available. It may be typically used without further purification.

Schiff bases are prepared by refluxing equimolar quantities of the p-substituted benzaldehyde and aniline in anhydrous ethanol for about 4 to 6 hours. The solvent and water are removed and the residue recrystallized several times from ethanol until the transition temperatures remain constant. The crude yields ranged from 70 to 90%. The infrared spectra show a strong band at 1629 cm.$^{-1}$ corresponding to the carbon nitrogen double bond in Schiff base compounds. Other absorptions are compatible with the expected structures.

Transition temperatures are determined on a Leitz Ortholux polarizing microscope using a Mettler FP-2 heating gauge.

N(p - n-butyryl oxybenzylidene)-p-aminophenylacetate (where $x$ is 3 in the basic structure) was prepared in accordance with this invention. The structure was analyzed at 70.3 percent by weight carbon, 5.81 percent by weight hydrogen, and 4.66 percent by weight nitrogen compared with calculated theoretical analysis values of 70.78 percent by weight carbon, 6.24 percent by weight hydrogen, and 4.13 percent by weight nitrogen. The compound changed from the crystalline to the smectic phase at about 92.3° C. and from smectic to isotropic at about 135.1° C.

The liquid-crystal compounds prepared in accordance with this invention may be utilized in display devices, especially of the electronic type.

Such devices typically comprise a thin layer of liquid crystals sandwiched between two sheets of glass. Normally, the thin layer of liquid-crystal material is clear, but when an electric field is applied to it, some portions or regions of the material become turbulent so as to scatter light. By controlling the size and shape of the turbulent regions, images can be formed. Primarily, this effect is obtained by use of liquid-crystal materials of the nematic type.

Various embodiments of liquid-crystal electro-optical devices are disclosed and illustrated in U.S. Letters Patents 3,401,262 and 3,410,999; Proceedings of the IEEE, vol. 56, No. 12, Dec., 1968, pp. 2146 to 2149; The Glass Industry, August 1968, pp. 423 to 425; Chemical and Engineering News, Sept. 30, 1968, pp. 32 and 33; Physics Today, July 1970, pp. 30 to 36; Electronics, July 6, 1970, pp. 64 to 70; U.S. Letters Patent 3,322,485 to Williams.

It is also contemplated using the liquid-crystal compounds in a charge storage display/memory device, especially multiple gas discharge display/memory panels which have an electrical memory and which are capable of producing a visual display or representation of data such as numerals, letters, television display, radar displays, binary words, etc.

Multiple gas discharge display and/or memory panels of the type with which the present invention is especially concerned are characterized by an ionizable gaseous medium, usually a mixture of at least two gases at an appropriate gas pressure, in a thin gas chamber or space between a pair of opposed dielectric charge storage members which are backed by conductor (electrode) members, the conductor members backing each dielectric member being transversely oriented to define a plurality of discrete discharge volumes and constituting a discharge unit. In some prior art panels the discharge units are additionally defined by surrounding or confining physical structure such as by cells or apertures in perforated, glass plates and the like so as to be physically isolated relative to other units. In either case, with or without the confining physical structure, charges (electrons, ions) produced upon ionization of the gas of a selected discharge unit, when proper alternating potentials are applied to selected conductors thereof, are collected upon the surfaces of the dielectric at specifically defined locations and constitute an electrical field opposing the electrical field which created them so as to terminate the discharge for the remainder of the half cycle and aid in the initiation of a discharge on a succeeding opposite half cycle of applied voltage, such charges as are stored constituting an electrical memory.

An example of a panel structure containing non-physically isolated or open discharge units is disclosed in U.S. Letters Patent 3,499,167 issued to Theodore C. Baker et al.

An example of a panel containing physically isolated units is disclosed in the article by D. L. Bitzer and H. G. Slottow entitled "The Plasma Display Panel—A Digitally Addressable Display With Inherent Memory," Proceedings of the Fall Joint Computer Conference, IEEE, San Francisco, Calif., November 1966, pp. 541–547. Also reference is made to U.S. Letters Patent 3,559,190.

In the operation of the panel, a continuous volume of ionizable gas is confined between a pair of dielectric surfaces backed by conductor arrays forming matrix elements. Typically one or more of the dielectric layers are photoemissive. The cross conductor arrays may be orthogonally related (but any other configuration of conductor arrays may be used) to define a plurality of opposed pairs of charge storage areas on the surfaces of the dielectric bounding or confining the gas. Thus, for a conductor matrix having H rows and C columns the number of elemental discharge volumes will be the product H×C and the number of elemental or discrete areas will be twice the number of elemental discharge volumes.

In addition to the matrix configuration, the conductor arrays may be shaped otherwise. Accordingly, while the preferred conductor arrangement is of the crossed grid type as discussed herein, it is likewise apparent that where an infinite variety of two dimensional display patterns are not necessary, as where specific standardized visual shapes (e.g., numerals, letters, words, etc.) are to be formed and image resolution is not critical, the conductors may be shaped accordingly.

The gas is one which produces light (if visual display is an objective) and a copious supply of charges (ions and electrons) during discharge. In an open cell Baker et al. type panel, the gas pressure and the electric field are sufficient to laterally confine charges generated on discharge within elemental or discrete volumes of gas between opposed pairs of elemental or discrete dielectric areas within the perimeter of such areas, especially in a panel containing non-isolated units.

As described in the Baker et al. patent, the space between the dielectric surfaces occupied by the gas is such as to permit photons generated on discharge in a selected discrete or elemental volume of gas to pass freely through the gas space and strike surface areas of dielectric remote from the selected discrete volumes, such remote, photon struck dielectric surface areas thereby emitting electrons so as to condition other and more remote elemental volumes for discharges at a uniform applied potential.

With respect to the memory function of a given discharge panel, the allowable distance or spacing between the dielectric surfaces depends, inter alia, on the frequency of the alternating current supply, the distance typically being greater for lower frequencies.

In the practice of this invention, it is contemplated that a particular liquid crystal may be prepared and/or utilized alone or in combination with other liquid-crystal compositions of the same or different family, e.g. such as mixture of 2 or more compositions. This may be especially desirable since mixtures of compounds may have lower transition temperatures than the individual compounds.

We claim:

1. As a composition of matter, a compound having the chemical structure

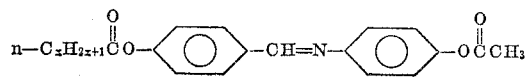

where $x$ is an integer of 1 to 10.

2. The invention of claim 1 wherein $x$ is 3 and the compound changes from the crystalline to the smectic phase at about 92.3° C. and from smectic to isotropic at about 135.1° C.

References Cited

UNITED STATES PATENTS 3,540,796  11/1970  Goldmacher et al. __ 260—479 R

JAMES A. PATTEN, Primary Examiner

U.S. Cl. X.R.

260—404; 350—160 LC